(12) United States Patent
Steadman

(10) Patent No.: US 6,758,152 B2
(45) Date of Patent: Jul. 6, 2004

(54) APPLICATION OF HYDROPHILIC POLYMER TO EXISTING SOD

(75) Inventor: Lynn Steadman, American Falls, ID (US)

(73) Assignee: Sod Guys, Inc., American Falls, ID (US)

( * ) Notice: Subject to any disclaimer, the term of this patent is extended or adjusted under 35 U.S.C. 154(b) by 0 days.

(21) Appl. No.: 10/167,088

(22) Filed: Jun. 10, 2002

(65) Prior Publication Data

US 2003/0015125 A1 Jan. 23, 2003

Related U.S. Application Data

(60) Provisional application No. 60/306,303, filed on Jul. 18, 2001.

(51) Int. Cl.[7] ............................................. A01C 23/00
(52) U.S. Cl. ..................................................... 111/128
(58) Field of Search ................................ 111/118, 128, 111/129, 925, 127; 172/21, 4.5, 540, 554

(56) References Cited

U.S. PATENT DOCUMENTS

| | | | |
|---|---|---|---|
| 1,117,333 A | * 11/1914 | Cooper ........................ 404/90 |
| 2,649,060 A | 8/1953 | Hawkins et al.. | |
| 2,649,061 A | * 8/1953 | Hawkins et al. ............ 111/128 |
| 2,866,422 A | * 12/1958 | Colson ........................ 111/128 |
| 2,975,735 A | * 3/1961 | Purvance ..................... 111/128 |
| 3,025,806 A | * 3/1962 | Peck ............................ 111/128 |
| 3,211,114 A | * 10/1965 | Ucinhaska ................... 111/128 |
| 3,602,166 A | * 8/1971 | Peterson ...................... 111/128 |
| 3,926,131 A | * 12/1975 | Collins ........................ 111/118 |
| 4,034,686 A | 7/1977 | Collins .......................... 111/7 |
| 4,178,860 A | 12/1979 | Hines et al. .................... 111/7 |
| 4,233,915 A | * 11/1980 | Kordon ....................... 111/128 |
| 4,649,836 A | * 3/1987 | Overocker ................... 111/128 |
| 4,803,626 A | * 2/1989 | Bachman et al. ............. 701/50 |
| 4,919,060 A | 4/1990 | Cady .......................... 111/128 |
| 5,107,895 A | 4/1992 | Pattison et al. ......... 137/625.11 |
| 5,178,078 A | 1/1993 | Pendergrass ................ 111/128 |
| 5,353,724 A | 10/1994 | Wheeley, Jr. | |
| 5,623,886 A | * 4/1997 | Marangi ..................... 111/200 |
| 5,769,169 A | 6/1998 | Miksitz ....................... 172/21 |
| 5,862,833 A | 1/1999 | Perez .................... 137/625.11 |

* cited by examiner

*Primary Examiner*—Victor Batson
(74) *Attorney, Agent, or Firm*—Workman Nydegger

(57) ABSTRACT

The apparatus of the invention is configured to deposit a fluid, such as a hydrophilic polymer solution, into existing sod. The apparatus includes a frame, a cylindrical housing, spikes protruding perpendicularly away from the housing, two rotating hubs, a tank, tubing connecting the tank to the rotating hubs, tubing connecting the rotating hubs to the spikes, and a pump for pumping fluid from the tank to the rotating hubs where the fluid is forced into the spikes and ultimately into the earth. The apparatus is also configured such that the fluid is only expelled from the spikes while the spikes are in the earth.

25 Claims, 8 Drawing Sheets

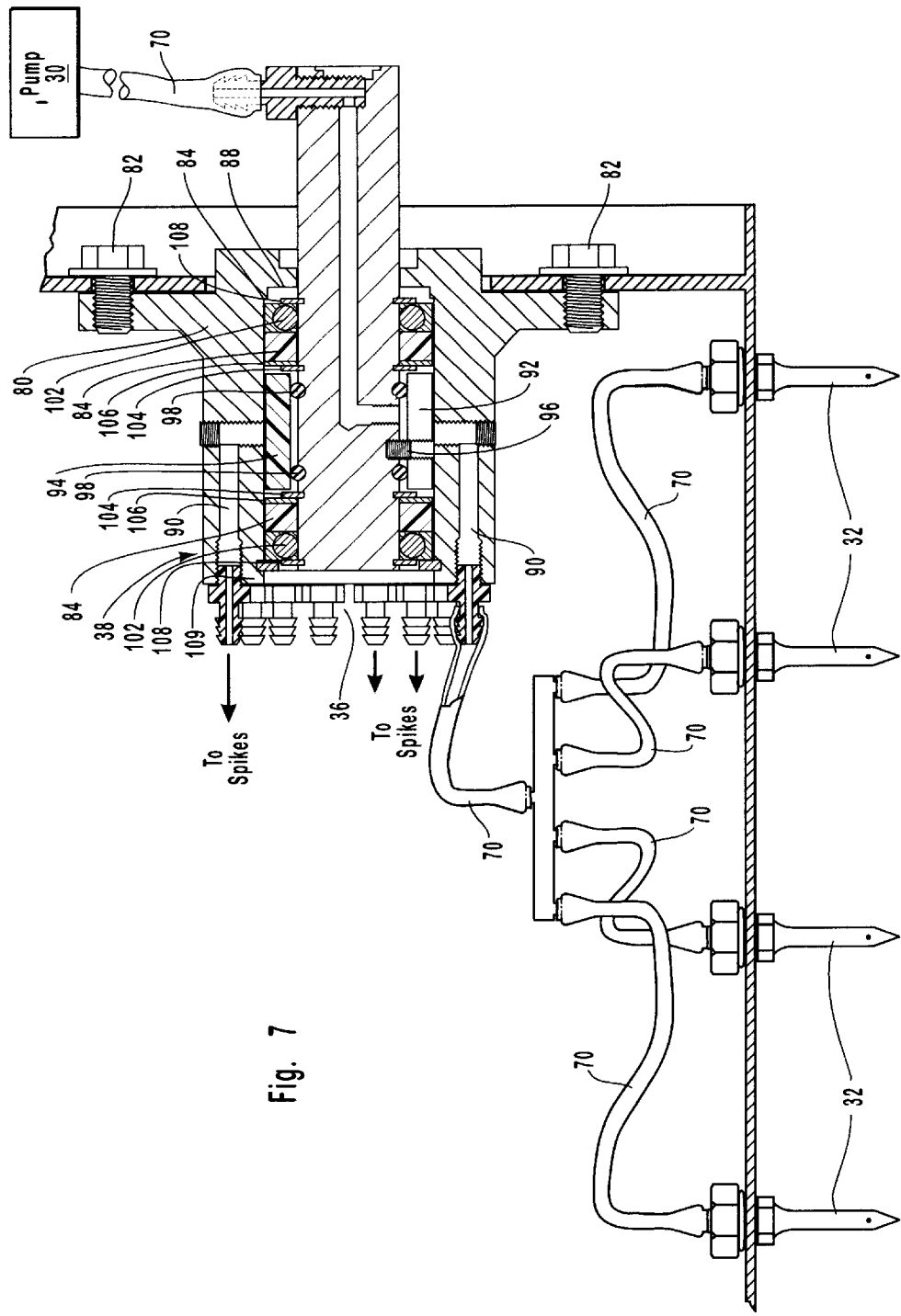

APPLICATION OF HYDROPHILIC POLYMER TO EXISTING SOD

RELATED APPLICATION

This application claims the benefit of U.S. Provisional Application Serial No. 60/306,303, entitled "Apparatus For Applying Hydrophilic Polymer To Existing Sod," filed Jul. 18, 2001, which is incorporated herein by reference.

BACKGROUND OF THE INVENTION

1. The Field of the Invention

The present invention relates to the fields of agriculture and horticulture. More particularly, the present invention relates to improved apparatus and methods for depositing hydrophilic polymers into existing sods.

2. The Prior State of the Art

It is well known that water is essential for plant growth and productivity. The amount of water that is required to sustain a plant, however, will vary depending on the climate, the type of plant, and the water holding capacity of the soil. Although rainfall and percolating ground water can satisfy some water requirements, irrigation is typically required as a supplement for providing an adequate and regular supply of water, for growing healthy and productive plants, particularly in arid climates.

Grass sod, which is commonly grown and groomed as an aesthetic covering for yards, parks, sports fields, golf courses, and other landscapes, is one example of a plant that typically requires supplemental irrigation for sustenance. To maintain the health and aesthetic appearance of the grass, it is essential that an adequate and regular supply of water be provided, approximately 0.5 inches per week, otherwise the grass will wilt and brown, and thereby frustrate the aesthetic and functional purposes for which the grass is grown.

One of the most popular irrigation methods is sprinkler irrigation. Sprinkler irrigation is popular because it is convenient and controllable and can therefore provide the regular supply of water that is required for growing healthy grass sod. One problem with sprinkler irrigation, however, is that it is expensive, even after discounting the initial investment for installation. Although some of the cost of sprinkler irrigation is associated with general maintenance, the majority of the cost is related to the purchase price of the water, which can be exorbitant, particularly in arid regions. Another problem associated with sprinkler irrigation, as well as with other watering methods, is that the fertilizers and nutrients used by the grass are leached away as the water percolates through the ground.

One method for reducing irrigation requirements and, hence the overall costs associated with maintaining sod, is with the use of hydrophilic polymers. Hydrophilic polymers are able to capture and retain up to several hundred times their weight in water. Accordingly, hydrophilic polymers can be used to generally increase the water holding capacity of the soil. More particularly, when water is supplied to grass sod, it is absorbed and stored by the hydrophilic polymers until the water is needed and used by the grass. When used in this manner, hydrophilic polymers can generally reduce irrigation requirements by about 30% to 60%. Agricultural and horticultural uses of hydrophilic polymers, such as polyacrylamide, are well known in the art.

There are different methods for applying hydrophilic polymers to grass sods. The polymers may, for example, be applied to the soil prior to growing the sod or, alternatively, the polymers can be applied to existing sod. It is difficult to apply hydrophilic polymers to existing sod, however, because the polymers must be inserted below the exposed grass layer and into or proximate the roots of the grass. It will be appreciated that this is not an easy task because the polymer cannot flow through the grass and into the soil while embodied in granular form. The polymer also cannot be sprayed and absorbed into the soil with an aqueous solution because the polymer cannot be diluted or otherwise suspended in water. In particular, once the polymer is introduced to water it will absorb the water, swell in size, and generally turn into a gel-like substance that cannot be absorbed through the sod.

Currently, there are three known prior art methods for placing hydrophilic polymers into the soils of mature sods. The first generally involves boring a hole into the sod with pressurized water and then using pressurized air to blow the polymer into the hole. The second method generally involves forming holes by removing small plugs out of the sod with small tubes, such as is done during aeration, and then dropping the polymer into the holes. These methods, however, are not very efficient. In particular, it has been found according to one study that they are only able to actually place about 20% to 30% of the polymer into the holes that are formed. The remainder of the polymer remains on the surface of the exposed grass where it provides no benefit. This is not only inefficient, but it can also create a hazardous condition. In particular, the polymer remaining on the top surface of the grass becomes very slippery when it is hydrated. Polymer left exposed on the grass surface is also accessible to be ingested by small children and animals. Yet another consequence of leaving the polymer on the surface of the grass is that it is relatively expensive, particularly when considering approximately 70% to 80% of the polymer product is essentially wasted since the water captured by the exposed polymer is inaccessible to the roots of the grass. For at least these reasons, the first two methods and apparatus for depositing hydrophilic polymers are undesirable because they are unable to effectively deposit the substantial entirety of the polymer into the sod and beneath the exposed grass surface where it is beneficial.

The third existing method for placing polymer into the soil of grass sod involves cutting and temporarily uprooting small sections of sod while the polymer is blown or otherwise applied to the soil under the sod. This method overcomes several of the aforementioned problems by ensuring the polymer is deposited below the exposed surface of the sod where it can provide utility. However, this method is also problematic because it can cause significant disruption to the root systems of the sod when the sod is temporarily uprooted. Uprooting sod is also problematic because it can temporarily or permanently disrupts the substantially smooth appearance surface of the exposed grass surface, thereby frustrating the aesthetics provided by the sod.

Yet another problem with each of the aforementioned methods for depositing hydrophilic polymers into the soils of existing sod is that they are slow which, it will be appreciated, increases the costs associated with applying the polymer. Existing devices, for example, are only presently able to deposit polymer into existing sod at rates of approximately 3,000 $ft^2$/hr to 4,000 $ft^2$/hr, taking approximately 11 to 14 hours to treat a single acre, during which time the device must be operated by a paid worker.

Accordingly, there is currently a need in the art for improved apparatus and methods for placing hydrophilic polymers into soils of existing grass sods.

SUMMARY AND OBJECTS OF THE INVENTION

The present invention generally relates to improved apparatus and methods for depositing hydrophilic polymers into existing sod in a controlled, efficient and relatively non-invasive manner.

In one preferred embodiment, the improved apparatus of the invention includes a frame, a cylindrical housing, spikes protruding radially away from the cylindrical housing, two rotating hubs, a tank, tubing connecting the fluid reservoir to the rotating hubs, tubing connecting the rotating hubs to the spikes, and a pump for pumping fluid from the tank to the rotating hubs where the fluid is forced into the spikes and ultimately into the earth.

According to one aspect of the invention, the frame is mounted to a driving mechanism that pushes and/or pulls the frame and generally causes the cylindrical housing and rotating hubs to rotate about a central axle of the rotating hubs. Fluid from the tank is pumped through the central axle and iteratively distributed through the rotating hubs to internal tubing that carries the fluid to the plurality of spikes that are attached to the cylindrical housing.

As the cylindrical housing rotates, the spikes are iteratively forced into the soil. Each spike is configured with a tapered end and an outlet hole located at the backside of the tapered end. During use, the rotating hubs channel the fluid into the spikes, but only while the spikes are inserted within the existing sod, thereby preventing the fluid from being discarded and ultimately wasted on the exposed surface of the sod. A computerized speed sensor and pressure regulator can be used to ensure the fluid is deposited at the appropriate time and with an appropriate amount of pressure.

According to one aspect of the invention, the apparatus of the invention further includes a secondary roller that is attached to the frame and which rolls on the surface of the ground behind the cylindrical housing. This secondary roller applies an appropriate force to the surface of the ground to substantially flatten out any sod that is displaced by the spikes as they are forcibly rotated through the sod.

It will be appreciated that this invention generally enables controlled and efficient deposition of hydrophilic polymer into existing sod and at desired depths, which not only reduces the costs associated with placing the polymer but also improves the general utility of the polymer once it is placed. The methods and apparatus of the invention provide an improvement over prior art devices for at least reducing the disruption that is caused to the sod, while at the same time enabling controlled and efficient distribution of the hydrophilic polymer into the sod.

These and other benefits, features, and advantages of the present invention will become more fully apparent from the following description, or may be learned by the practice of the invention as set forth hereinafter.

BRIEF DESCRIPTION OF THE DRAWINGS

In order that the manner in which the above-recited and other benefits, features, and advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 7 is a cutaway side view of the cylindrical housing showing a rotating hub interconnected through tubing with multiple spikes that are attached to the cylindrical housing;

DETAILED DESCRIPTION OF THE PREFERRED EMBODIMENTS

I. Apparatus for Applying Hydrophilic Polymer to Sod

Figure 1:
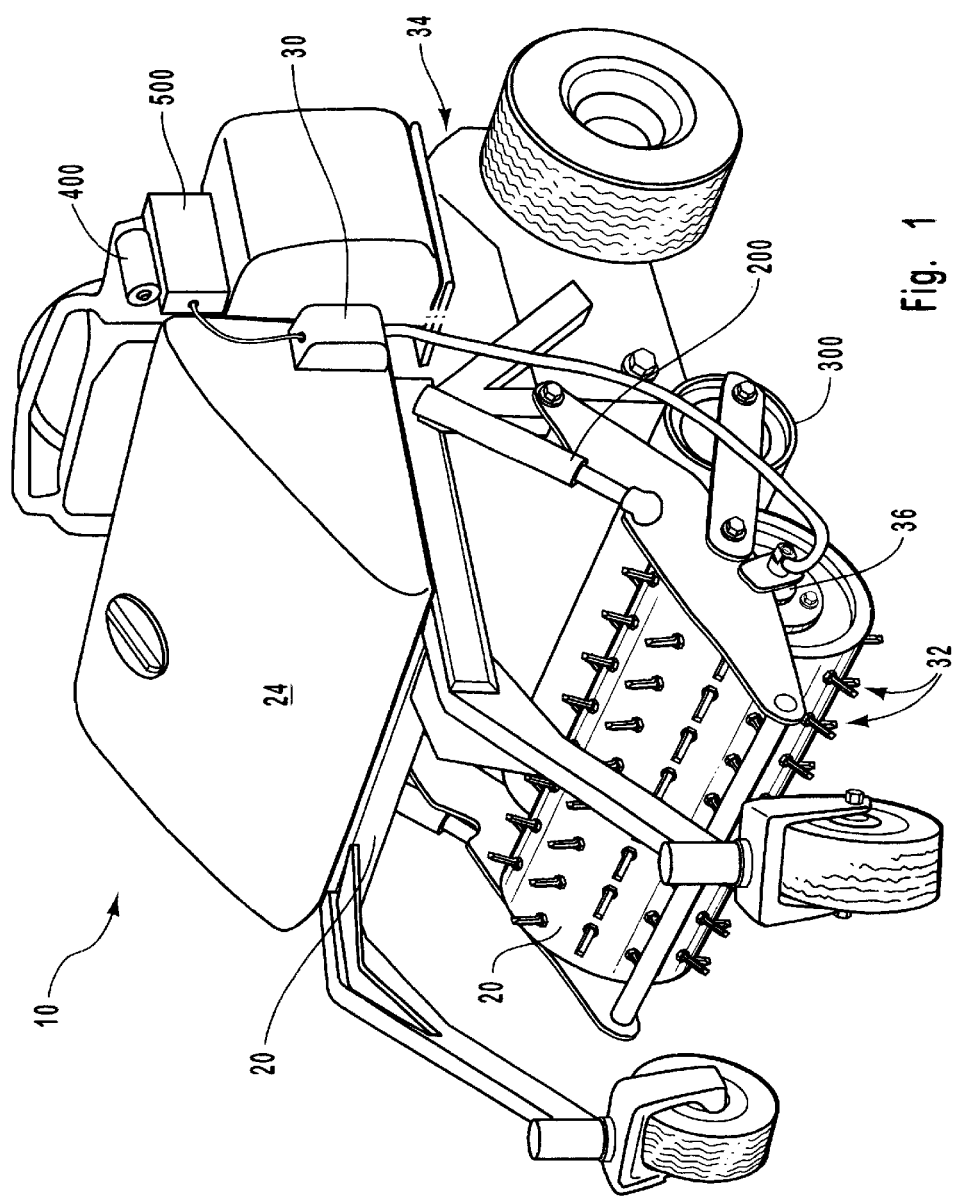
FIG. 1 illustrates a perspective side view of one embodiment of the apparatus of the invention that includes a frame, a cylindrical housing, multiple spikes, a tank, a pump, tubing, a rotating hub, means for lifting and lowering the cylindrical housing, and a secondary roller.

In one presently preferred embodiment, which is illustrated in FIG. 1, the improved apparatus 10 of the invention includes a frame 20, a housing 22 rotatably mounted to the frame, a tank 24 configured for carrying a fluid, and a pump 30 configured for pumping the fluid to a plurality of spikes 32 that are disposed on the rotable housing 22. Each of these components will now be described with regard to their intended function for enabling the apparatus 10 of the invention to deposit hydrophilic polymer into exiting sod.

The terms "existing sod" and "sod," which are used interchangeably herein are each defined as a surface of the ground. Existing sod includes an exposed layer, which typically, but not necessarily, includes a grass or another plant, and a subterranean layer that includes soil, dirt, sand, roots, and other typical components. Although the apparatus of the invention provides advantages over the prior art devices configured for depositing hydrophilic polymer to existing sod, it will be appreciated that the apparatus of the invention can also be used to apply fluids to other surfaces that do not include an exposed layer of grass. According to the invention, the term "sod" may also apply broadly to any ground surface.

The apparatus 10 of the invention can be used to deposit a variety of fluids into an existing sod. In one embodiment, the apparatus 10 of the invention is used to deposit a fluid that includes a hydrophilic polymer into the soil. The term "hydrophilic polymer," as defined herein, includes any polymer that is configured to absorb a liquid. Examples of hydrophilic polymers include, but are not limited to polyacrylamides, sodium polyacrylates, hydrogel polymers, and gel-forming polymers. The fluids that can be applied with the apparatus of the invention may also include, but are not limited to water, organic fertilizers, inorganic fertilizers, microbial stimulants, soil conditioners and treatments, pesticides, herbicides and any combination thereof.

It has been found that hydrophilic polymers can greatly reduce irrigation requirements for sod when the hydrophilic polymer is present in the soil beneath the sod. However, as mentioned above, existing devices have been unable to efficiently deposit the hydrophilic polymers into or beneath the exposed layer of the sod in an efficient and noninvasive manner. One reason for this is that existing devices are designed to deposit the hydrophilic polymer in a granular state rather than in a fluid state.

One reason that hydrophilic polymers are typically deposited in a granular state is that, until recently, it has been unknown how to suspend the hydrophilic polymer in a fluid state. However, methods for suspending hydrophilic polymer within a liquid fertilizer or another fluid state have recently been developed, such that the hydrophilic polymer does not set into a coagulated gel form until after it is deposited into the earth. By way of example, Enviromoist comprises one suitable example of a fluid that includes hydrophilic polymer suspended in a liquid state. Enviromoist is commercially distributed by BioPlusNutrients of Grace, Id. It will be appreciated, however, that the invention is not limited to the application of any particular hydrophilic polymer, or fluid for that matter.

According to the presently preferred embodiment, the apparatus 10 of the invention controllably injects the desired fluid into an existing sod in a controlled, efficient and substantially non-intrusive manner by utilizing the housing 22 and spikes 32, which are more clearly illustrated and described below in reference to FIG. 2.

Figure 2:
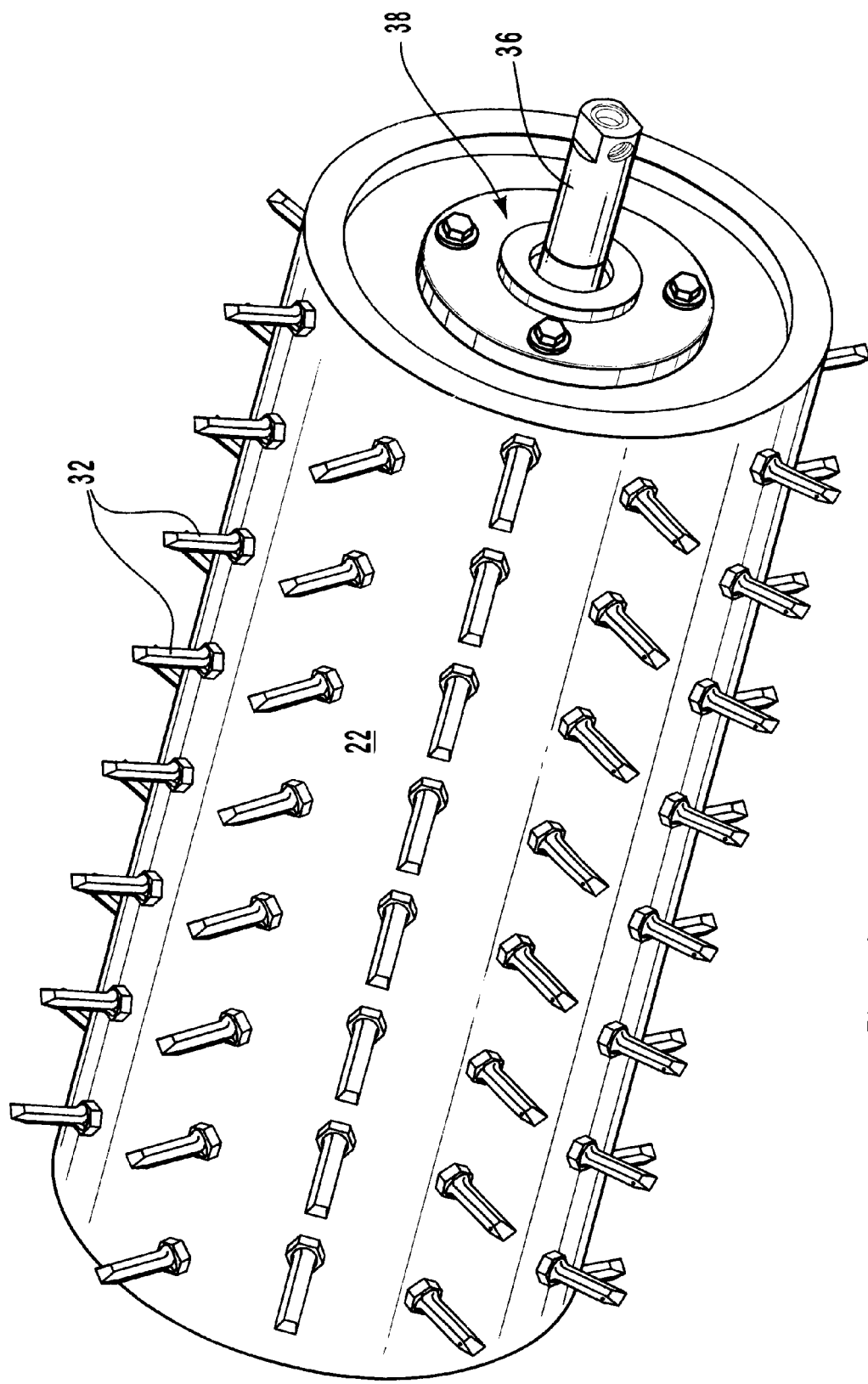
FIG. 2 is a perspective view of one embodiment of the cylindrical housing of the invention.

FIG. 2 generally illustrates a perspective view of the housing 22 and a plurality of spikes 32 that are mounted tangentially to the housing 22 with either a fixed or removable coupling. It will be appreciated that suitable means for coupling the spikes 32 to the housing 22 include, but are not limited to, threaded couplings, welds, friction fittings, clamps, adhesives and any combinations thereof. One benefit of coupling the spikes 32 fixedly to the housing 22, such as with welding, is increased stability. One benefit of removably coupling the spikes 32 to the housing 22, such as with a threaded coupling, is the flexibility to adjust or replace the spikes 32 when they become damaged or when it is otherwise desired such as, for example, when it is desired to exchange the spikes 32 with new spikes possessing a new and desired characteristic, such as a particular design or material composition, or length or other dimension.

According to one preferred embodiment, the housing 22 is cylindrical, approximately twelve inches in diameter, and approximately thirty inches in length. According to this embodiment, ninety-six spikes 32 are affixed uniformly and symmetrically over the housing 22, such that the housing 22 includes twelve rows, each row having eight spikes 32. It will be appreciated, however, that the quantity of spikes 32, as well as the pattern and distribution of the spikes 32 over the housing 22 may vary to accommodate different needs and preferences. For example, as a matter of illustration and not limitation, each row of spikes 32 may include two, four, ten, twelve, or any other desired quantity of spikes 32. The spikes 32 may also be arranged into any desired pattern. Staggering the spikes 32, for example, can be useful for minimizing the disruption caused to the sod by the spikes 32 as the spikes 32 are radially forced through the sod in the iterative manner described below.

During use, the housing 22 is either pushed or pulled by the frame 20 of the apparatus 10, which is shown in FIG. 1, when the frame is pushed or pulled by a driving mechanism. The driving mechanism may include a motor 34, or alternatively, a mechanized cart, tractor, truck, another vehicle, an animal, a human, or any combination thereof. The housing 22 is rotatably mounted to the frame 20, such that it will rotate with the frame is either pushed or pulled. In certain embodiments, the driving mechanism exerts a force through wheels. In other embodiments, not shown, the driving mechanism exerts a force through tracks.

According to one preferred embodiment, the housing 22 is rotatably mounted to the frame about the axle 36 extending through the hub 38 of the housing 22. The axle 36 and the hub 38, which are more clearly illustrated in FIGS. 7–9, are discussed in more detail below. Generally, the hub 38 operates to distribute the fluid to the spikes 32 while the housing 22 is rotated about the central axle 36 of the hub 38. According to a presently preferred embodiment, there are two rotating hubs 38 that are located at opposite ends of the cylindrical housing 30, each of which is rotatably mounted to the frame for facilitating rotation of the housing. Only one hub is visible in FIGS. 1 and 2.

During use, the housing 22 is forced to rotate over a desired surface, such as sod. While rotating over the sod, the spikes 32 are iteratively forced into the ground under the weight of the housing 22 and the apparatus 10. To withstand the corresponding forces that are applied to the spikes 32 during this procedure, it is preferred that the spikes 32 are designed to be sufficiently strong. For example, according to one embodiment, about 900 lbs. are distributed among the spikes 32 contacting the ground at any given time. According to one preferred embodiment, this weight helps ensure the spikes 32 are driven into the ground in the desired manner, although less or more weight can also be used. Forces applied to the spikes 32 also include forces generated by the driving mechanism.

II. Spikes

Figure 3A:
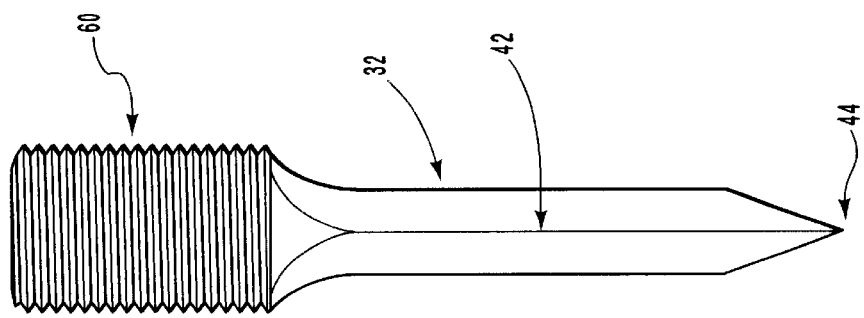
FIG. 3A is a front view of one presently preferred embodiment of a spike of the invention.
Figure 3B:
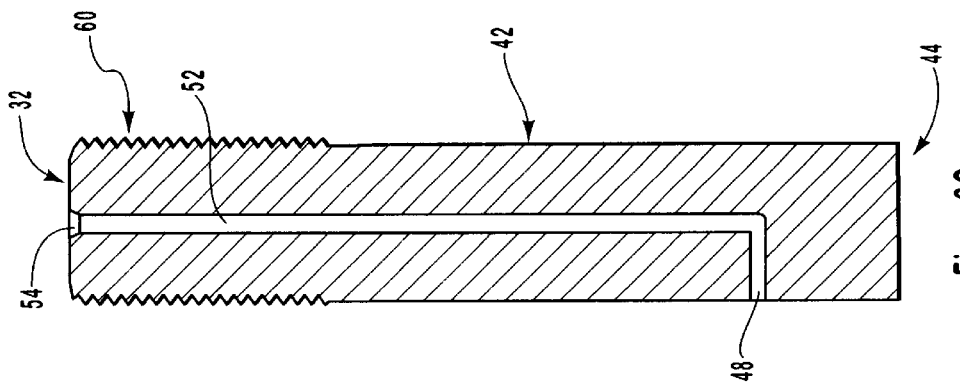
FIG. 3B is a back view of the spike shown in FIG. 3A.
Figure 3C:
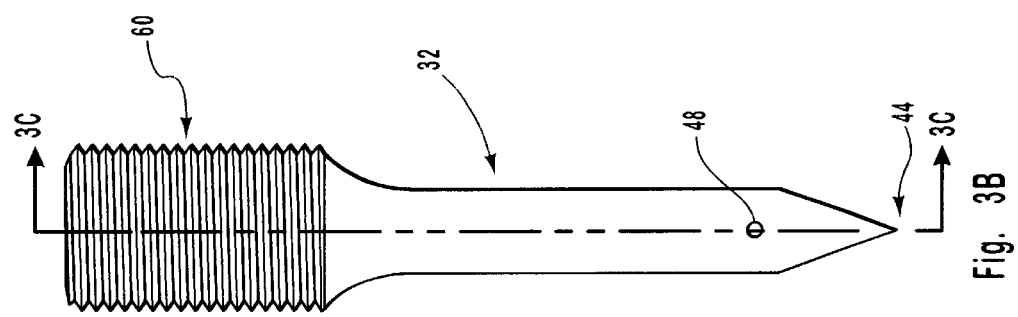
FIG. 3C is a cross-sectional side view of the spike shown in FIG. 3A.

FIGS. 3A–3C illustrate one presently preferred embodiment of the spike 32 that is configured for use with the apparatus of the invention. As shown in FIG. 3A, the spike 32 includes a front side that is tapered into a cutting edge 42 and a tip 44 that is also tapered for facilitating passage of the spike 32 through the ground. The backside of the spike 32, shown in FIG. 3B, includes an exit port 48 through which the fluid is deposited during use. This location of the exit port 48, above the tip 44 of the spike 32, is useful for preventing clogging of the exit port 48 during use. As shown in FIG. 3C, the spike 32 is also hollowed, having an internal passageway 52 that is formed through the center of the spike 32, terminating at exit port 48. During use, the desired fluid is forced into the inlet end 54 of the spike 32, through the internal passageway 52, and out of the exit port 48 into the ground, as shown and described below in more detail in reference to FIG. 5.

It will be appreciated that the shape and size of the spike 32 may vary according to various embodiments to accommodate different needs and preferences. According to one embodiment, the spikes 32 are between about 3.0 inches and about 4.0 inches in length, with the exit port 48 positioned at about 0.5 inches from the tip 44. This embodiment has been found to be useful for causing the fluid and hydrophilic polymer to be inserted beneath the sod at depths ranging from about 1.0 inch to about 2 inches along arcuate strips that are cut in the soil by the spikes 32 during use, as described below. According to a preferred embodiment, the exit port 48 is about 0.125 inches in diameter. The size of the inlet 56 of the hollowed spike 32 may vary in diameter and is only constrained by the size of the outer diameter of the spike 32 and the wall thickness of the spike 32. According to the preferred embodiment, the spike 32 has an outer diameter of approximately 0.5 inches and a wall thickness within the range of approximately 0.0625 inches and approximately 0.1875 inches. It will be appreciated, however, that these measurements may vary to accommodate different needs, preferences, and material compositions of the spike 32.

For instance, according to one alternative embodiment, the spikes are about 10.0 inches to about 11.0 inches in length. This embodiment is useful, for example, for depositing fluid into agricultural fields. It will be appreciated that in order to accommodate the additional length of the spikes, the diameter of the housing and the hub may also be enlarged to thereby minimize any damage caused to the sod by the spikes as they are forced in and out of the ground. The large cylindrical housing may be pushed or pulled behind a large tractor for example.

In all embodiments, the material composition of the spikes 32 may comprise any suitable material. Suitable materials include, but are not limited to polypropylene, polycarbonate, thermoset plastics, steel, alloy aluminum, stainless steel and brass. The housing 22, which is described above in reference to FIG. 2, may also be manufactured from these materials. The spikes 32 may be manufactured with any suitable process. Suitable non-limiting manufacturing processes include casting, injection molding, forging, machining, and combinations of the above.

Figure 4:
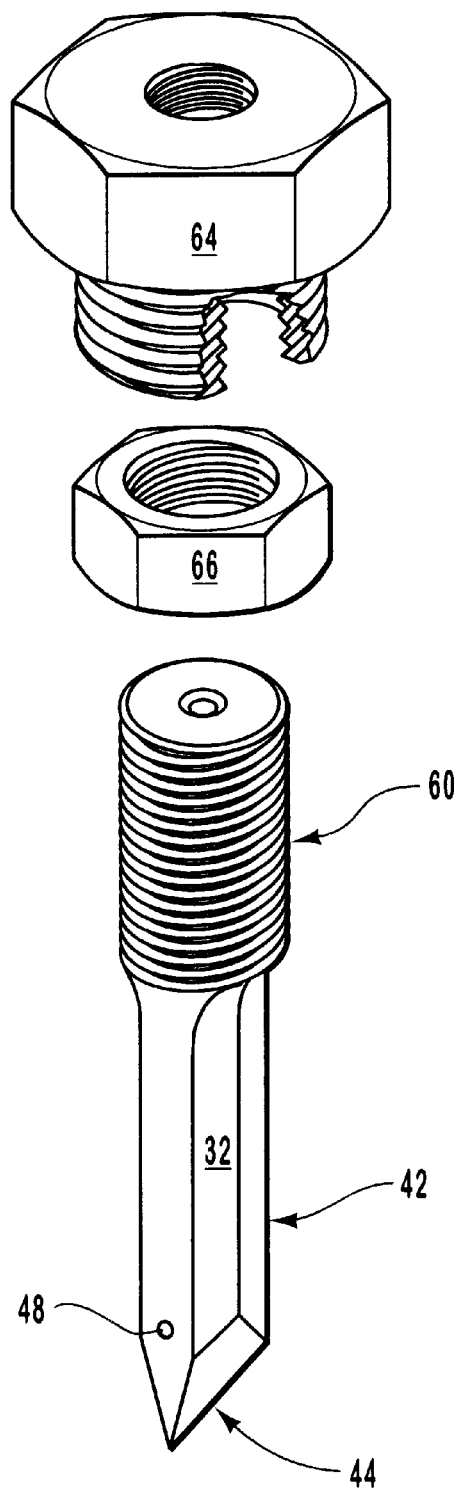
FIG. 4 is an exploded perspective view of a spike that includes a mounting nut and a lock nut for mounting and locking the spike to the cylindrical housing of the apparatus.

As shown in FIGS. 3A–3C, the spike 32 of the present embodiment also includes threads 60 for facilitating attachment to the housing 22. The threads 60 can be configured to screw directly into threading in the housing 22 or into a corresponding mounting nut 64, which is illustrated in FIG. 4. For example, the mounting nut 64 can be threadably secured to the housing 22, as shown in FIG. 5, with the spike 32 threadably secured to the mounting nut 64.

Figure 5:
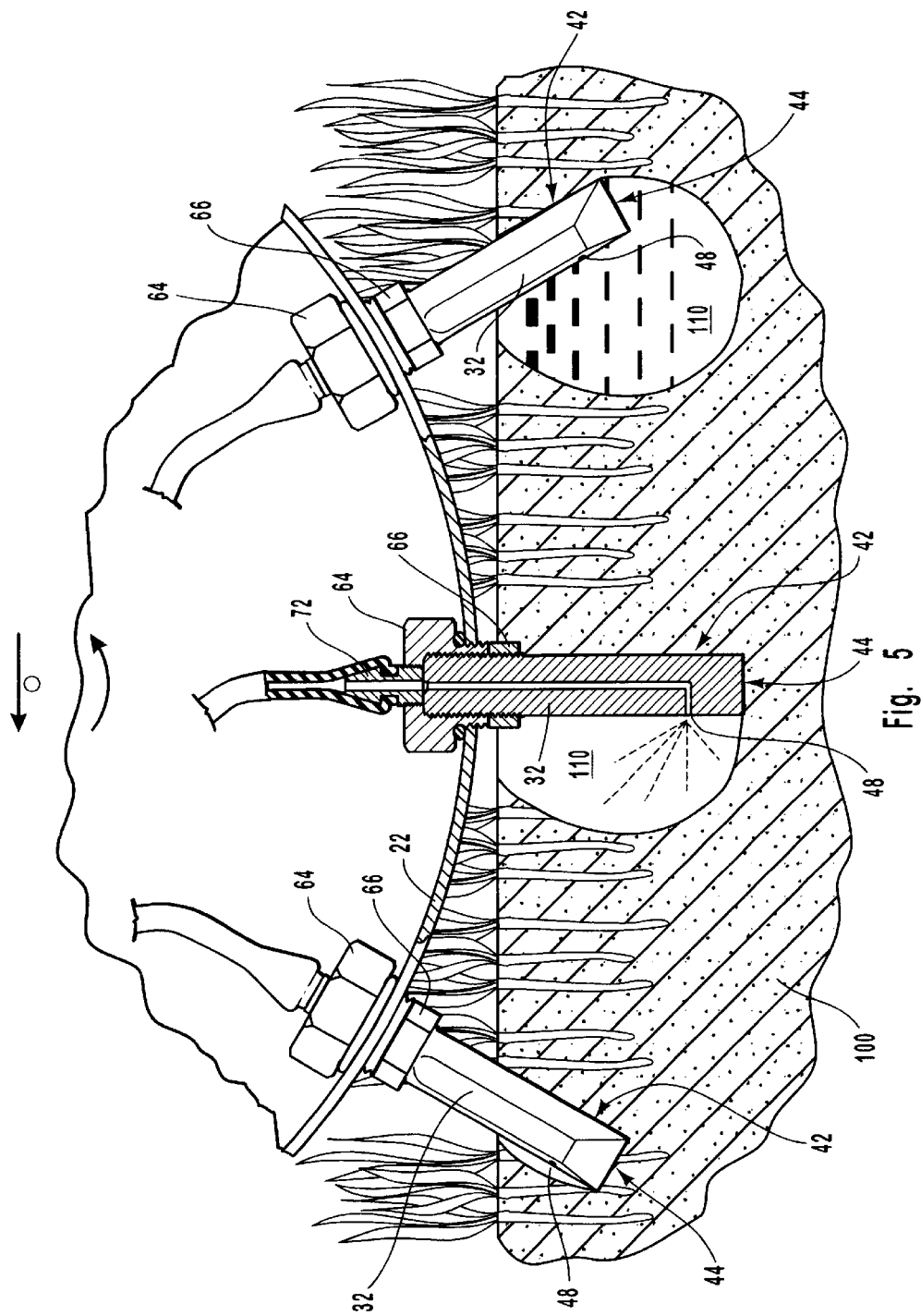
FIG. 5 is a partial cross-sectional side view of the cylindrical housing and three spikes mounted to the cylindrical housing in which the spikes are shown penetrating an existing sod with hydrophilic polymer being injected into cavities that are formed in the ground by the spikes.

As shown in FIGS. 4 and 5, a lock nut 66 can also be used with the invention. For example, the lock nut 66 can be used, as shown in FIG. 5, to further secure the spike 32 to the housing 22, either directly or indirectly via the mounting nut 64. One benefit of using a lock nut 66 is that the spike 32 can be partially unscrewed from the mounting nut 64, while still being secured in place by the lock nut 66 to the housing 22, such that the relative length of the spike 32 from the housing can be adjusted as desired. The lock nut 66 can also be used to secure the spike 32 in a desired alignment with respect to the housing 22.

FIG. 5 further illustrates how the spikes 32 are connected to tubing 70, through which the fluid is channeled during use. In particular, a tube coupling device 72 is threaded into the mounting nut 64 which is sealably connected to the spike 32, as generally described above. It will be appreciated that in order to enhance the seal between the spike 32 and the mounting nut 64, Teflon tape or a sealing solution can also be placed between the treads of the spike 32 and the mounting nut 64.

Figure 6:
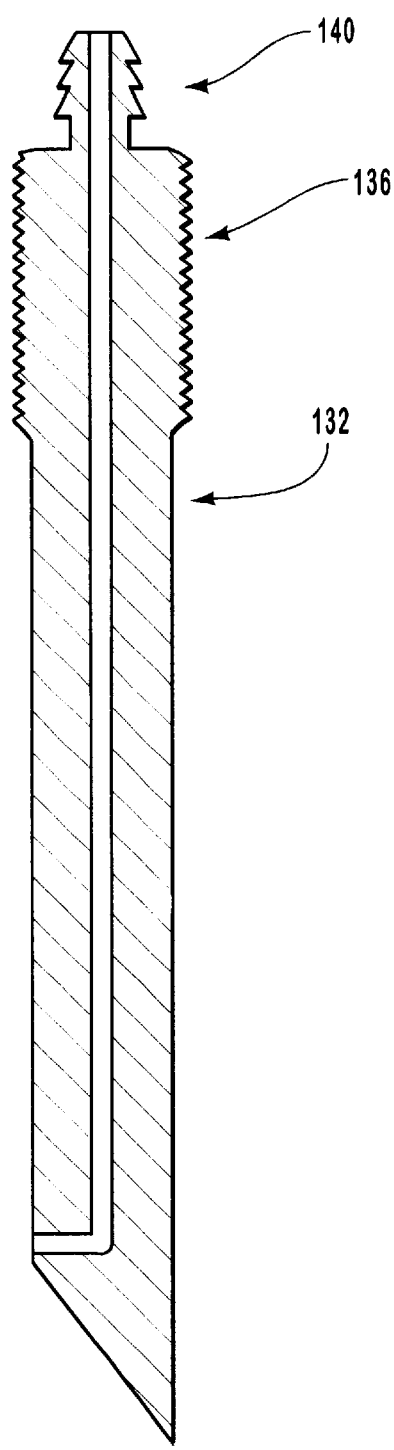
FIG. 6 is a partial cross-sectional side view of one embodiment of a spike that can be used with the apparatus of the invention.

FIG. 6 illustrates another spike 132 which can be used with the apparatus of the invention. In this embodiment, the spike 132 is also configured with threads 136 to couple the screw 132 directly to the housing or to a corresponding mounting nut (not shown). The spike 132 also includes barbs 140 for facilitating attachment of the spike 132 to the tubing of the apparatus.

III. Hub Mechanism and Fluid Distribution

Turning now to FIG. 7, it is shown how the tubing 70 interconnects the spikes 32 to the fluid distribution hub 38. Tubing 70 also connects the hub 38 to a pump 30 that is configured to pump fluid from the holding tank 24, shown in FIG. 1, to the distribution hub 38. According to one preferred embodiment, the pump 30 is configured to pressurize the fluid as it is channeled to the hub 38 so that it will be forcibly ejected from the spikes 32 during use. The pressure provided by the pump is preferably between about 5 psi and about 200 psi and, more preferably, between about 60 psi to about 80 psi. One benefit of pressurizing the fluid to a pressure of at least about 60 psi is that it causes the fluid to be injected or sprayed with a sufficient force that it will disperse within the ground, wherein it is injected. It will be appreciated, however, that the pump 30 can also be configured to pressurize the fluid to much lower or much higher pressures to accommodate different needs and preferences, such as for example, to accommodate different fluids having different viscosities, to accommodate different quantities of spikes supplied by the pump, to accommodate varying diameters of the fluid passageways within the spikes, the hub and interconnecting tubing, and to accommodate different speeds of the apparatus (e.g. radial velocity of the spikes).

The size of the holding tank 24 may vary to accommodate different needs and preferences. According to one embodiment, the holding tank 24 has a holding capacity within the range of about one gallon and about 50 gallons of fluid. In other embodiments, the size of the holding tank 24 is much larger and can hold more than 50 gallons of fluid.

The hub 38 shown in FIG. 7 includes an axle 36 and a hub body 80 that is rotatably mounted on the axle 36. The hub body 80 is also mounted to the spike housing 22 with bolts 82, or another securing means, such as by welding, rivets, etc. By securely mounting the housing 22 to the hub body 80, the housing 22 is enabled to rotate about the axle 36 with the hub body 80. More particularly, when the housing 22 is placed on the ground and the axle 36 is pushed or pulled in a direction parallel to the ground, such as, for example, with the frame 20 and motor 24 shown in FIG. 1, the housing 22 and hub body 80 are forced to rotate about the axle 36. The hub 36 may also include bushings 84 that are disposed between the axle 36 and the hub body 80 to facilitate rotation and to help align the hub body 80 on the axle 36. To minimize friction created during rotation, the bushings 84 are smooth and preferably, but not necessarily, composed of a material having a low coefficient of friction such as polytetrafluoroethylene (Teflon), Nylon, Ryton, Neoprene, and spun ultra high molecular weight polyethylene (UHMW PE).

During rotation of the hub body 80 about the axle 36, a plurality of fluid distribution channels 90 that are formed within the hub body 80 iteratively align with an opening 92 that is formed within a dispenser ring 94 that is securely mounted to the axle 36 between the bushings. In one presently preferred embodiment, a screw 96 is used to secure the dispenser ring 94 to the axle 36. Rather than passing through the dispenser ring 94 body, the screw 96 passes through the opening 92 in the dispenser ring 94. This configuration is useful for helping preserve the seal of the dispenser ring 94. The dispenser ring 94, which is shown in more detail in FIG. 8A, is preferably composed of a material having a low coefficient of friction, such as Teflon, UHMW, Ryton, and Neoprene.

Figure 8A:
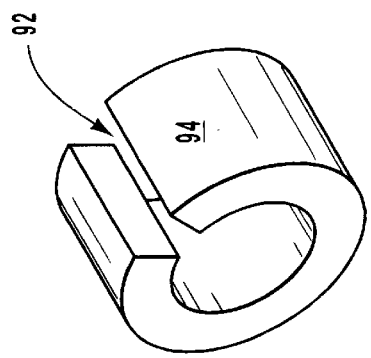
FIG. 8A is a perspective view of one embodiment of the dispenser ring of the present embodiment.
Figure 8B:
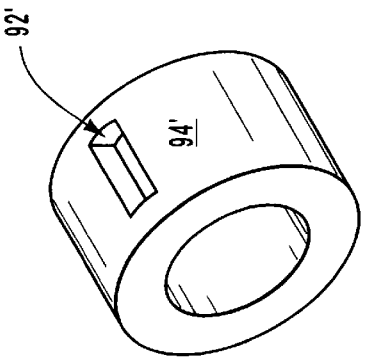
FIG. 8B is a perspective view of one embodiment of the dispenser ring of the present embodiment.
Figure 9:
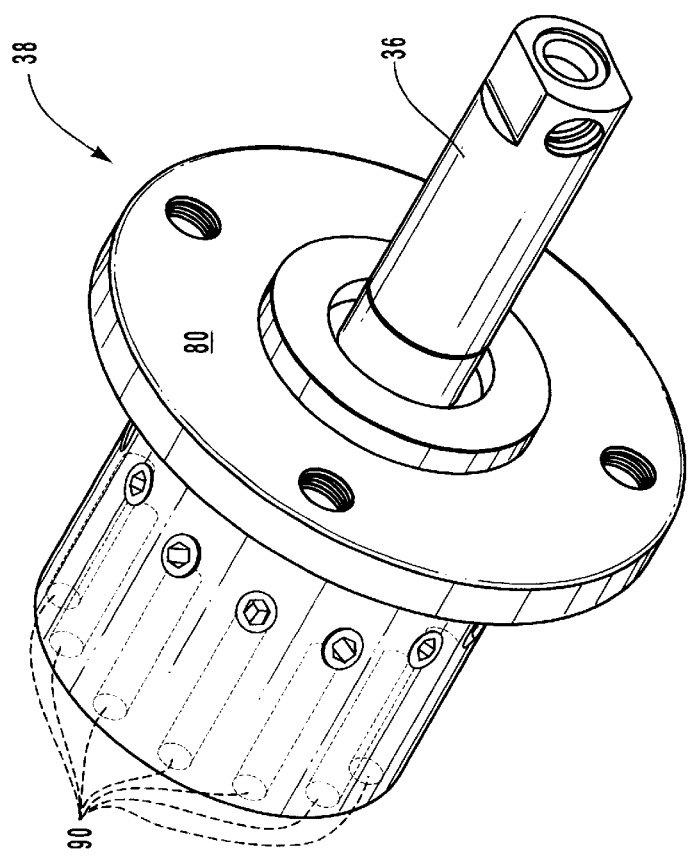
FIG. 9 illustrates a perspective view of the hub of the apparatus according to one presently preferred embodiment.

As shown in FIG. 8A, the opening 92 in the dispenser ring 94 extends the full length of the dispenser ring 94. According to one alternative embodiment shown in FIG. 8B, however, the opening 92' extends only through a contained portion of the dispenser ring 94'. It will be appreciated that this alternative embodiment is useful for helping to seal the opening 92' of the dispenser ring 94' between the axle 36 and the hub housing 80.

In one embodiment, as shown in FIG. 7, other sealing means may be used to help seal the dispenser ring 94 to the axle 36 of the hub. For example, the bushings 84 and O-rings 98 can help to seal the dispenser ring 94 to the axle 36, to prevent leaking of the fluid from the hub.

To help the hub housing 80 rotate about the axle 36, for enabling distribution of the fluid through the hub, as described below, the hub may also include bearings 102. As shown, the bearings 102 engage the hub housing 80 and the axle 36, enabling the hub housing 80 to rotate about the hub axle 36. To help hold the various components in a desired placement on the axle 36, the hub may also include snap rings 104, washers 106, and retaining rings 108 and 109.

FIG. 9 illustrates a perspective view of the hub 38 and how the hub body 80 is mounted on the central axle 36. The central axle 36 is hollow and is preferably composed of a material that is non-reactive and that will not corrode when it comes in contact with the fluid. The material composition of the axle 36 can include any variety of materials to accommodate the different compositions and fluids that are used with the apparatus of the invention. Suitable non-limiting examples of materials for the axle 36 include stainless steel and brass.

Returning now to FIG. 7, the operation of the hub will now be explained. During use, fluid is pumped into the axle 36 of the hub, whereupon it is forced through the axle 36 and into the opening 92 of a dispenser ring 94. As the hub body 80 rotates about the axle 36, the fluid is then forced into the fluid distribution channels 90 as they iteratively align with the opening 92 in the dispenser ring 94. The pressurized fluid is then forced through the tubing 70 and to the spikes 32 where it is ultimately expelled into the ground.

According to one presently preferred embodiment, the hub 38 includes twelve fluid distribution channels 90 that are uniformly distributed around the hub housing 80, each of which is in fluid communication with four spikes 32 that are contained in a single one row of spikes. Accordingly, each of the fluid distribution channels 90 supplies four of the eight spikes that are contained within each of the twelve rows of spikes that are disposed on the housing 22, as shown in FIG. 2. The remaining four spikes in each row are supplied by a second hub (not shown), which is axially and rotationally aligned with the first hub 38 but which is located on the opposite side of the housing 22, such that all of the spikes in any single row are simultaneously and collectively supplied by the two hubs.

According to one alternative embodiment, the apparatus of the invention only includes a single hub 38, such that the axle 36 extends completely through the housing 22 and is supported at the opposite side of the housing 22 with a suitable bearing, bushing or other means for rotatably coupling the housing 22 to the axle 36. In this embodiment, each of the fluid distribution channels 90 is also connected to suitable tubing 70 for enabling each of the fluid distribution channels 90 to adequately supply fluid to every spike contained within a single row. It will be appreciated that according to this alternative method, the apparatus is fully operable with only a single hub 38.

It will be appreciated that according to each of the foregoing embodiments, the hub 38 is configured to divert the pressurized fluid to the spikes 32 only for the duration of time in which the spikes are embedded within the sod, thereby preventing the hydrophilic polymer or other fluid from being wasted and discarded on the surface of the sod.

It should also be appreciated that the present invention is an improvement over the prior art methods and apparatus for applying hydrophilic polymer to existing sod for at least this reason. As described below, the apparatus of the invention is also able to deposit the fluid within existing sod in a minimally intrusive manner, without having to uproot the sod, which is another improvement over certain prior art devices and methods.

IV. Injection of Fluid into Sod

Attention is now directed to FIG. 5, which illustrates one suitable method for injecting fluid into existing sod. As shown, three spikes 32 are shown at various stages of being inserted and withdrawn from the sod 100. The spikes 32 are iteratively forced in and out of the sod 100 as the cylindrical housing 22 is forced to rotate. The tapered tips 44 and cutting edges 42 on the spikes 32 enable the spikes 32 to cut through the sod 100 without unnecessarily disrupting the sod 100. As the spikes 32 cut into the sod 100, they create small arcuate cavities 110, as shown. These cavities 110 are at least partially filled by the hydrophilic polymer solution, or other desired fluid, while the spikes 32 form the cavities 110. In particular, the fluid is dispensed out of the exit port 48 of each spike 32 while the spike 32 is inserted within the sod 100 and preferably only while the spike 32 is the sod 100. Once the a spike 32 is rotated out of the sod 100 then the fluid stops flowing to that spike 32 until it is again inserted within the sod 100. It will be appreciated, however, that because the hydrophilic polymer solution, or other fluid, is in a liquid state, residual amounts of the fluid may come out of the spikes 32 once they have come out of the sod 100. Nevertheless, because the fluid is no longer channeled to a spike that has come out of the sod, the amount of fluid that is unintentionally expelled above the sod 100 can be minimized.

According to one presently preferred embodiment, and taking into account the approximate 0.5 inches of spacing that is provided by the exposed grass, the spikes 40 have a maximum insertion depth of about 2.0 inches to about 3.0 inches into the sod 100, with the exit ports 48 positioned to have a maximum insertion depth of about 1.0 inch to about 2.0 inches in the sod 100. This generally causes the fluid to be deposited in the sod or soil beneath the sod 100 in a substantially arcuate path with a length of about 1.0 inch to about 2.0 inches and at a depth ranging between about 1.0 inch and about 2.0 inches. It will be appreciated, however, that the depth in which the fluid is deposited into the sod 100 may vary by changing the length of the spikes, the location of the exit ports 48, the radial speed of the spikes, the pressure of the fluid, or any combination of the above. According to one preferred embodiment, approximately 75 lbs of fluid, comprising approximately 20 lbs of hydrophilic polymer, is deposited every acre. However, the quantities of fluid and hydrophilic polymer may vary to accommodate different needs and preferences.

It will be appreciated that while the housing 22 rolls along the sod 100, it compresses the exposed grass and generally provides a seal for preventing the hydrophilic polymer solution or other fluids from shooting out of the cavities 110 while the fluids are discharged into the cavities 110. The housing 22 also helps apply pressure for compressing the sod so as to minimize excessive tearing and displacement of the sod when the spikes 32 cut through the sod 100.

The speed at which the apparatus of the invention operates is limited by the speed at which the driving mechanism can push or pull the device. According to one preferred embodiment, the driving mechanism causes the depositor device to move at speeds ranging from less than about 3.0 miles per hour to relatively high speeds exceeding about 8.0 miles per hour. These speeds generally enable the hydrophilic polymer solution to be applied to existing sod at rates of between about 1.0 acres/hour and about 3.0 acres/hour, which is a significant improvement over the devices of the prior art.

Although specific examples have been given with regard to the various embodiments of the invention, it will be appreciated that devices and methods described may be modified without altering the scope of the invention. For example, in one alternative embodiment, the housing 22 is connected to a lifting means 200, as shown in FIG. 1, such as a pneumatic, hydraulic or mechanical lever, for lowering the housing 22 during use and for lifting the housing 22 during periods of non-use. It will be appreciated that this can help force the spikes 32 into the ground while at the same time enabling the housing 22 to be temporarily displaced to accommodate any irregular surfaces over which the housing 22 may pass, thereby preserving the life of the spikes when hard surfaces or structures are encountered during use.

According to certain other embodiments, the apparatus 10 of the invention may also include a secondary roller 300 that is rotatably attached to the frame 20 and which rolls on the surface of the ground right behind the housing 22 during use. This secondary roller 300 applies force to the surface of the ground and substantially flattens any sod that is displaced by the spikes 32 during use.

According to yet another embodiment of the invention, the apparatus 10 can include a speed sensing system for identifying the speed in which the apparatus 10 is traveling and controlling the flow rate of the fluid. The speed sensing system may include, for example, a radar velocity sensor 400 and a computer system 500 that is capable of interpreting the speed data and controlling at least one of the apparatus speed and the fluid pressure. For instance, the pump 30 can be controlled to alter the pressure and the ultimate flow rate of the fluid to accommodate a desired result based on the speed in which the apparatus 10 is traveling. According to one example, the speed sensing system monitors the speed at which the apparatus 10 is traveling and correspondingly causes a valve associated with the pump 30 to open and close in a suitable manner for sending the fluid to the hub at a desired pressure. It will be appreciated that in this manner the speed sensor can help maintain a constant delivery rate of the fluid regardless of the speed of the apparatus. A non-limiting example of a speed sensing system according to the invention includes a radar velocity sensor 400, such as the DICKEY-John RVSII, and a computer system 500, such as the Raven Industries' model SCS 330 and SCS660.

According to yet another embodiment, not shown, the apparatus includes a plurality of housings that are concentrically aligned, each having corresponding spikes, hubs, and pumps. The plurality of housings can also be connected to a single shared tank or to individual tanks. It will be appreciated that the utility of providing a plurality of housings in this manner is that the fluid can be applied more quickly to a desired area.

It should appreciated that the apparatus of the invention generally enables controlled, efficient and minimally intrusive deposition of hydrophilic polymer into existing sod at desired depths and at high speeds. It should also be appreciated that these benefits are advantages over the prior art devices used to apply hydrophilic polymer to existing sod. Other advantages and benefits of the invention should be apparent from the disclosure that is provided herein.

It will be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An apparatus configured for depositing a fluid into existing sod, the apparatus comprising:

a frame configured to be moved by a driving mechanism;

a tank having a capacity to carry a fluid;

a housing rotatably mounted to the frame about a central axle in such a manner that the housing is able to rotate about the central axle and to roll over the sod when the frame is moved by the driving mechanism;

a plurality of spikes mounted to the housing such that the spikes are forced in and out of the sod when the housing rotates over the sod;

a fluid distribution hub comprising:

a hub body that rotatably mounts the housing to the frame about the central axle, the hub body including a plurality of distribution channels formed therein; and a fluid dispenser ring that is configured to direct fluid entering the hub into each one of the fluid distribution channels when said fluid distribution channels become aligned with a slot formed in a dispenser ring that is mounted to the central axle, and wherein each one of the fluid distribution channels becomes temporarily and exclusively aligned with the slot formed in the dispenser ring for at least a moment during a complete rotation of the hub body about the axle, wherein tubing interconnects each of the fluid distribution channels with at least two corresponding spikes; and a pump configured to pump the fluid from the tank to the spikes through tubing and a fluid distribution hub and in such a manner that the fluid is forced into each of the spikes only at the moment in which the spikes are inserted within the sod.

2. An apparatus as recited in claim 1, wherein the tank is configured with a holding capacity of at least five gallons.

3. An apparatus as recited in claim 1, wherein the plurality of spikes include ninety-six spikes that are arranged in twelve rows, each row including eight spikes aligned along a length of the housing.

4. An apparatus as recited in claim 1, wherein each of the spikes includes a tapered front edge and a tapered tip.

5. An apparatus as recited in claim 1, wherein each of the spikes is formed from stainless steel.

6. An apparatus as recited in claim 1, wherein the axle is formed from stainless steel.

7. An apparatus as recited in claim 1, wherein each of the spikes is removably mounted to the housing.

8. An apparatus as recited in claim 7, wherein each of the spikes is threadably mounted to the housing.

9. An apparatus as recited in claim 1, wherein each of the plurality of distribution channels is connected to eight spikes in a single row.

10. An apparatus as recited in claim 9, wherein each one of the fluid distribution channels becomes temporarily and exclusively aligned with the dispenser ring at a moment in which the eight spikes are inserted into the sod.

11. An apparatus as recited in claim 1, wherein the plurality of fluid distribution channels includes eight fluid distribution channels.

12. An apparatus as recited in claim 1, wherein the pump is configured to pump the fluid to the hub at a pressure of between about 5 psi and about 200 psi.

13. An apparatus as recited in claim 12, wherein the pump is configured to pump the fluid to the hub at a pressure of at least 60 psi.

14. An apparatus as recited in claim 1, further including a radar velocity sensor configured to identify the speed at which the apparatus travels.

15. An apparatus as recited in claim 14, further including a computer configured to control a pressure of the fluid at the pump.

16. An apparatus as recited in claim 1, further including a lifting means for lowering and lifting the housing.

17. An apparatus as recited in claim 16, wherein the lifting means includes a hydraulic lever.

18. An apparatus as recited in claim 1, wherein the fluid includes a hydrophilic polymer.

19. An apparatus as recited in claim 18, wherein the fluid includes at least one of a liquid fertilizer, a soil conditioner, a microbial stimulant, a pesticide, and an herbicide.

20. An apparatus configured for depositing a fluid into existing sod, the apparatus comprising:
    a frame configured to be moved by a driving mechanism;
    a tank having a capacity to carry a fluid;
    a housing rotatably mounted to the frame about at least one central axle in such a manner that the housing is able to rotate about the at least one central axle and to roll over the sod when the frame is moved by the driving mechanism;
    a plurality of spikes mounted to the housing in a predefined arrangement, such that the spikes are forced in and out of the sod when the housing rotates over the sod;
    two fluid distribution hubs mounted on opposite sides of the housing, each of the hubs including:
        a hub body that rotatably mounts the housing to the frame about the at least one central axle, the hub body including a plurality of distribution channels formed therein;
        a fluid dispenser ring that is configured to direct fluid entering the hub into each one of the fluid distribution channels when said fluid distribution channels become aligned with a slot formed in a dispenser ring that is mounted to the central axle, and wherein each one of the fluid distribution channels becomes temporarily and exclusively aligned with the slot formed in the dispenser ring for at least a moment during a complete rotation of the hub body about the axle;
        tubing interconnecting each of the fluid distribution channels with at least two corresponding spikes; and
        a pump configured to pump the fluid from the tank to each of the fluid distribution hubs through tubing interconnecting the pump and the hub.

21. An apparatus as recited in claim 20, wherein each of the distribution channels is connected to four spikes in a single row, the row including eight spikes that are aligned along a length of the housing.

22. An apparatus as recited in claim 20, wherein each of the spikes is configured with an exit port through which the fluid exits each one of the spikes.

23. An apparatus as recited in claim 20, wherein each one of the fluid distribution channels becomes temporarily and exclusively aligned with the dispenser ring at a moment in which the spikes connected with each of the fluid distribution channels are inserted within the sod.

24. An apparatus as recited in claim 20, wherein each of the two hubs are in rotational alignment.

25. An apparatus as recited in claim 20, wherein the fluid includes a polyacrylamide.

* * * * *